Feb. 24, 1970

R. L. POWERS 3,497,040

SPRING RELEASE MEANS FOR BRAKE SHOES

Filed April 24, 1968

INVENTOR

RICHARD L. POWERS

BY Strauch, Nolan, Neale, Nies & Kurz
ATTORNEYS

Feb. 24, 1970 R. L. POWERS 3,497,040
SPRING RELEASE MEANS FOR BRAKE SHOES
Filed April 24, 1968 3 Sheets-Sheet 2
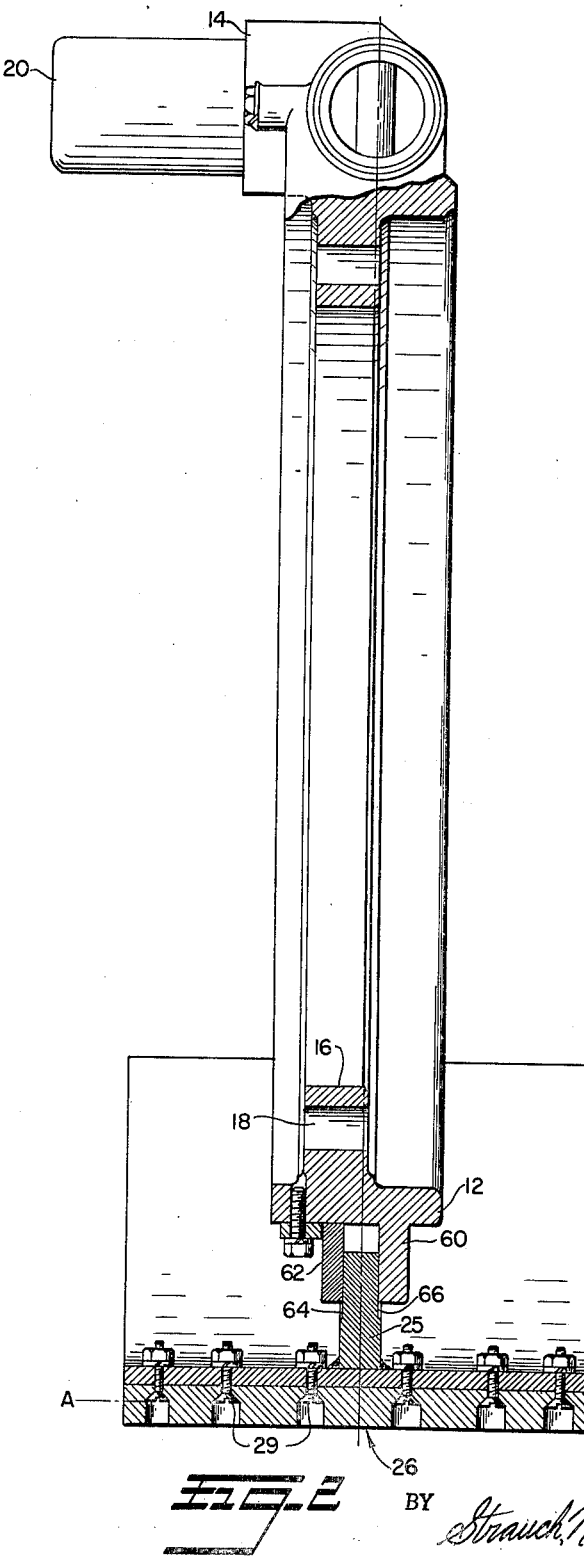
INVENTOR
RICHARD L. POWERS
BY Strauch, Nolan, Neale, Nies & Kurz
ATTORNEYS Feb. 24, 1970          R. L. POWERS          3,497,040
SPRING RELEASE MEANS FOR BRAKE SHOES
Filed April 24, 1968
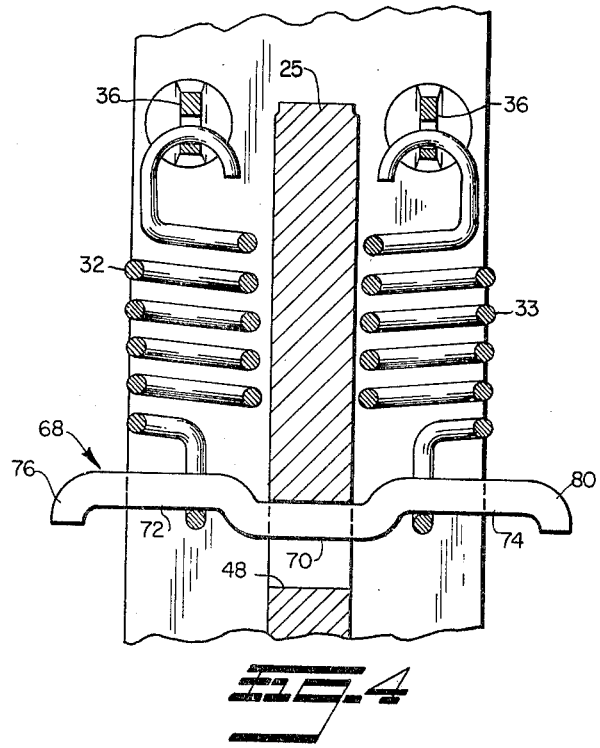
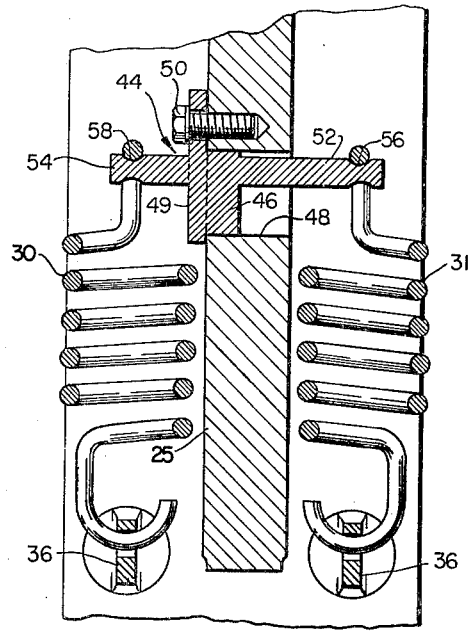
INVENTORS
RICHARD L. POWERS
BY 
ATTORNEYS United States Patent Office 3,497,040
Patented Feb. 24, 1970

3,497,040
SPRING RELEASE MEANS FOR BRAKE SHOES
Richard L. Powers, Conneaut, Ohio, assignors, by mesne assignments, to Rockwell-Standard Company, Pittsburgh, Pa., a corporation of Delaware
Filed Apr. 24, 1968, Ser. No. 723,812
Int. Cl. F16d 65/18
U.S. Cl. 188—216          2 Claims

ABSTRACT OF THE DISCLOSURE

A return spring system for a multiple floating shoe mechanism particularly adapted for use in very large diameter drum brakes. Each end of each brake shoe is urged toward release position by a pair of springs, the springs of each pair being on opposite sides of the brake shoe web. The connection between the springs and the web is such that both springs can be removed from the open side of the brake drum to permit removal and replacement of the brake shoes without removal of the brake drum or the vehicle wheels.

BACKGROUND OF INVENTION

This invention relates generally to vehicle brake systems and more particularly to brake shoe mounting and return spring mechanisms which have particular utility in a large brake of the type used in heavy duty off highway equipment. A typical brake, to which the invention may be applied, is disclosed in copending application Ser. No. 723,815 filed on even date herewith.

In heavy duty brakes, it is necessary that relatively strong return springs be provided on each side of the brake shoe web to provide sufficient force to assure rapid and full return of the brake shoes to release position and at the same time prevent tilting of the brake shoe with resulting unpredictable performance and binding in the brake shoe guides.

In prior constructions, even those which incorporate demountable brake shoe guides, it has been difficult or impossible to release and reengage the strong brake shoe return springs to permit removal and reinstallation of the brake shoes without removal of the vehicle wheels and brake drums.

In vehicles of small or medium size, this has proved to be an acceptable nuisance. However, in very large vehicles, replacement of the brake shoes, when required because of wear, has been a serious problem. In such vehicles, i.e., earth moving equipment, the tires may be six or seven feet in diameter and their size and weight prohibits manual handling. Further, it is often the practice to fill large tires with "lead flour," which is finely comminuted lead powder, to improve the tractive efficiency of the tires. Such a tire frequently weights several tons and its removal and replacement often requires a special crane and is thus, costly and time consuming and can be performed only when the special equipment is readily available. Often the problem is complicated by the neceessity of partially disassembling a gear drive system usually incorporated in the outer end of the axle in such heavy duty equipment.

SUMMARY OF INVENTION

It is the principal purpose and object of the present invention to provide, particularly in a large, heavy duty drum brake, an improved brake shoe spring return system which may quickly and easily be disconnected and reconnected to permit removal and replacement of the brake shoe without removal of the vehicle wheel or brake drum.

It is a further object of the present invention to provide an improved brake shoe return system of this type which requires little or no modification of existing brake shoe designs and which can be readily incorporated in existing constructions.

It is an additional object of the present invention to provide improved brake shoe spring return systems having the foregoing advantages which may be incorporated into existing brake systems at a negligible increase in cost.

Additional objects and advantages of the invention will become apparent as the description proceeds in connection with the accompanying drawings.

BRIEF DESCRIPTION OF DRAWINGS

FIGURE 2 is a section taken along line 2—2 of FIGURE 1 with parts behind the section line omitted for clarity;

FIGURE 3 is an enlarged fragmentary section taken along line 3—3 of FIGURE 1 illustrating a preferred form of the invention; and FIGURE 4 is a view similar to FIGURE 3 but showing a modified form of the invention.

DESCRIPTION OF PREFERRED EMBODIMENT

Figure 1:
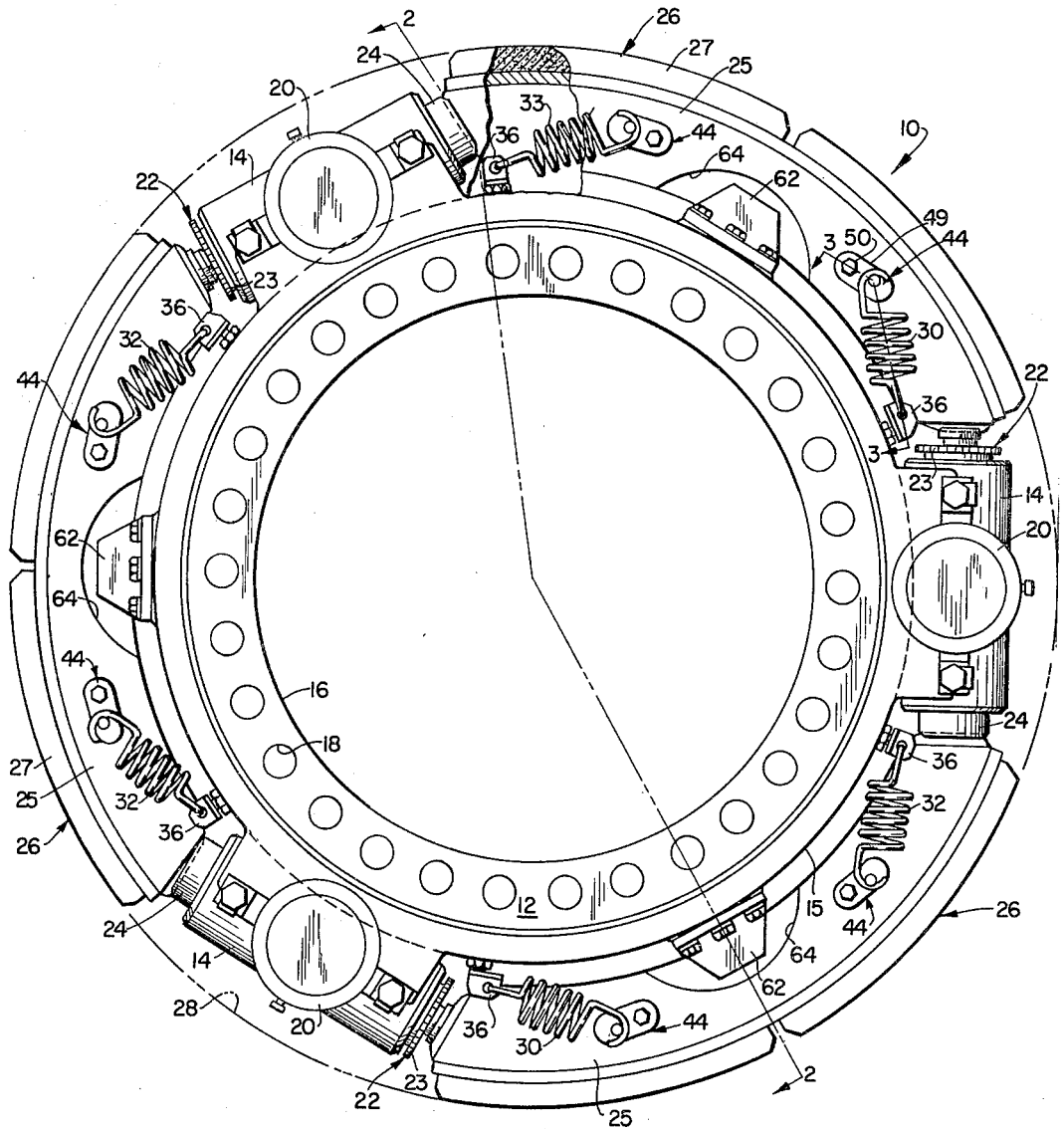
FIGURE 1 is an end view of a multiple floating shoe brake assembly incorporating the present invention.

Referring now more particularly to the drawings, the brake assembly 10 includes a central spider member 12 having multiple, i.e., at least three integrally cast actuator housings 14 symmetrically arranged and equidistantly spaced around the spider. The spider has a central opening 16 adapted to fit over the axle housing (not shown) and a series of holes 18 to receive bolts for attachment to the axle housing. The brake is of the double-ended balanced type and has a brake actuator connected to each of the housings 14, the actuators 20 including a piston and piston rod (not shown) that forces adjustable plunger 22 having an adjusting starwheel 23 and nonadjustable plunger 24 outwardly. The actuators and their respective housings and plungers are preferably of the type described in U.S. Patent 3,037,584. The plungers apply a braking force against the shoe web 25 in a circumferential direction and move each of the identical full floating shoe assemblies 26 to force the linings 27 into engagement with the brake drum represented by dot dash line 28. The normal clearance between the linings and the drum is too small to appear in the drawings. The linings may be secured to the shoes by bolts 29, the heads of which determine the maximum allowable lining wear. If the linings are bonded to the shoes, they may be substantially completely worn away before replacement becomes necessary.

Each of the brake shoes is held in retracted position out of contact with the brake drum by four identical return springs 30, 31, 32 and 33, the springs being symmetrically disposed and the springs 30 and 31 being at one end of the brake shoe on opposite sides of the web 25 and the springs 32 and 33 being at the opposite end of the brake shoe and on opposite sides of the web 25. At their inner ends, the springs are provided with hooks which extend through eyes 34 formed in the heads of bolts 36 threaded into the spider flange.

At their opposite ends, the springs are connected to the shoe web by a unique fitting 44. Fitting 44 comprises a cylindrical body 46 which fits within a circular through opening 48 in the web 25. At the side of the web facing the open end of the brake drum, the fitting is provided with an enlarged plate portion 49, through the offset portion of which a bolt 50 extends and is threaded into the web 25.

The fitting 44 also includes a pair of pins 52 and 54 preferably formed integrally with the remainder of the fitting, the pins projecting laterally of the web in a direction essentially normal to the web. At their outer ends the pins 52 and 54 are provided with circumferential indentations 56 and 58 to form retainer seats for the hooked end of the springs 30, 31, 32 and 33. It will be noted that the axes of the pins 52 and 54 are offset substantially from the axis of the cylindrical body portion 46. Accordingly, the tension on the springs depends upon the rotated position of the fitting 44.

Each of the brake shoes 26 is centered and held in alignment with respect to the brake drum 28 by a guide 60 integral with spider 12 and a cooperating hold-down guide 62 bolted to the spider, the flanges slidably engaging the shoe web 25 in web recesses 64 and 66, respectively. The removable guides 62 face the open end of the drum.

When the brake linings have become worn, replacement of the shoes may be accomplished in the following manner. First, the bolts 50 are removed. Upon the removal of one of the bolts the springs will rotate the fittings 44 to dispose the axis of the pins 56 and 58 closer to the fittings 36 to which the opposite ends of springs are attached. The parts are so proportioned and the eccentricity of the pins 56 and 58 is such that this movement will completely relieve the tension in the springs. The two immediately accessible springs 30 and 32 may then be removed.

The fitting 44 may be partially withdrawn from the openings 48, disengaging the springs 31 and 33 on the opposite side of the brake shoe web. The demountable guide 62 is then removed and the brake shoes are so manipulated to free the ends of the webs from the slots in the actuators. Usually this can be done by simple manipulation of the brake shoe assemblies. However, if necessary, the starwheels 23 can be rotated to increase the clearance available for this purpose. Also, there is usually sufficient clearance to permit removal of the brake shoes without removal of the fittings 36. However, the removal of these fittings is a simple matter if required.

The new brake shoe assemblies are placed in position with the adjustable plunger assemblies 22 fully retracted. The fittings 36 are reinstalled and the demountable guide 62 is bolted into position. Then the fitting 44, in its minimum tension position, is inserted partially into place and the end of the spring 31 or 33 is installed on the pin 56. The parts are so proportioned that when the fitting 44 is partially inserted into the opening 48 a screw driver or a similar tool can also be inserted through the opening to facilitate attachment of the spring on the pin 56. The fitting 44 is then fully inserted in the opening 48, the front spring 30 or 32 is attached to the pin portion 58. After the same operation is performed at the opposite end of the brake shoe, the fittings 44 are rotated to the position shown in FIGURE 4, and the assembly of the brakes is completed by installation of the bolts 50.

The embodiment of FIGURE 4 is the same as that described above except that the fitting 44 is replaced by a pin 68. As shown in FIGURE 4, the pin has a straight center section 70 received in the web opening 48 with substantial clearance At the opposite sides of the straight central portions the pin has spring hook receiving portions 72 and 74 which are coaxial but offset from the axis of the center section 70. The ends of the pins are turned in as at 76 and 80. By virtue of this construction the pin is securely held against accidental dislodgement and the spring ends in turn cannot be accidentally dislodged from the ends of the pin.

To disassemble this unit, the front or immediately accessible spring 30 or 32 is unhooked permitting the pin 68 to pivot in a direction to release the tension on the rearward spring 31 or 33 which may then be easily unhooked. To reinstall the assembly, the pin 68 is inserted through the opening 48 and hooked through the end of the rearward spring 31 or 33 and is then brought into the position shown in FIGURE 4 and the front spring is reengaged. The form of the invention shown in FIGURE 3 is preferred to that of FIGURE 4 since in the latter at least the forward springs must be engaged under full tension.

The invention may be embodied in other specific forms without departing from the spirit or essential characteristics thereof. The present embodiments are therefore to be considered in all respects as illustrative and not restrictive.

What is claimed and desired to be secured by Letters Patent is:

1. In a brake assembly including a brake shoe having a web movable on a support toward and away from a surrounding drum, a pair of brake return springs, one on each side of said web, means for connecting one end of each of said springs to said support, and common means securing the opposite ends of said springs to said web, said common means comprising a member having a body portion rotatably received in an opening in said web and spring engaging portions extending laterally from said body portion for disposition on opposite sides of said web, said spring engaging portions being eccentric with respect to the axis of said body portion whereby upon rotation of said member the tension of said springs varies between a maximum and a minimum, and removable means to selectively hold said member in said maximum spring tension position for brake operation or to permit said member to move to said minimum tension position to facilitate removal of said springs from said member.

2. A brake assembly according to claim 1 wherein said member has an enlarged plate portion adjacent said body portion, said plate portion having an opening through which said removable means extends into securing engagement with said web to hold said member in said maximum spring tension position for brake operation.

References Cited

UNITED STATES PATENTS

| 2,828,835 | 4/1958 | Brisson | 188—78 |
| 2,928,506 | 3/1960 | Goldman | 188—78 |
| 3,195,688 | 7/1965 | Goepfrich | 188—216 X |

FOREIGN PATENTS 165,921   5/1950   Austria.

GEORGE E. A. HALVOSA, Primary Examiner

U.S. Cl. X.R.

192—101